United States Patent
Derut et al.

(10) Patent No.: US 9,952,819 B2
(45) Date of Patent: Apr. 24, 2018

(54) METHOD AND SYSTEM OF AUTOMATED GENERATION OF USER FORM INTERFACE

(71) Applicant: 1C LLC, Moscow (RU)

(72) Inventors: Odey Halikovich Derut, Moscow (RU); Sergey Georgievich Nuraliev, Moscow (RU); Vitaliy Aleksandrovich Filippov, Moscow (RU); Dmitriy Lvovich Zaretskiy, Moscow (RU)

(73) Assignee: 1C LLC, Moscow (RU)

( * ) Notice: Subject to any disclaimer, the term of this patent is extended or adjusted under 35 U.S.C. 154(b) by 133 days.

(21) Appl. No.: 15/136,886

(22) Filed: Apr. 23, 2016

(65) Prior Publication Data

US 2016/0321021 A1    Nov. 3, 2016

(30) Foreign Application Priority Data

Apr. 29, 2015 (RU) ................................ 2015116133

(51) Int. Cl.
 *G06F 17/22* (2006.01)
 *G06F 3/14* (2006.01)
 *G06F 17/24* (2006.01)

(52) U.S. Cl.
 CPC ............ *G06F 3/1407* (2013.01); *G06F 9/451* (2018.02); *G06F 17/243* (2013.01)

(58) Field of Classification Search
 CPC ..... G06F 3/1407; G06F 17/243; G06F 3/0481
 See application file for complete search history.

(56) References Cited

U.S. PATENT DOCUMENTS

| | | | | |
|---|---|---|---|---|
| 7,089,295 B2* | 8/2006 | Christfort | ......... | G06F 17/30905 707/E17.121 |
| 7,665,014 B2* | 2/2010 | Kristiansen | ............... | G06F 8/30 715/221 |
| 8,413,110 B2* | 4/2013 | Leung | ................... | G06F 9/4443 717/106 |
| 8,731,973 B2* | 5/2014 | Anderson | .............. | G06Q 10/10 345/629 |
| 9,524,283 B2* | 12/2016 | Folsom | ................. | G06F 17/243 |
| 2004/0039990 A1* | 2/2004 | Bakar | ................... | G06F 17/243 715/222 |
| 2005/0039173 A1* | 2/2005 | Tondreau, Jr. | ............ | G06F 8/45 717/136 |

(Continued)

*Primary Examiner* — Maikhanh Nguyen
(74) *Attorney, Agent, or Firm* — Arent Fox LLP (57) ABSTRACT

A system and method is disclosed for carrying out an automatic generating of user interfaces in the form of dynamically changing screen forms. The method includes accessing object metadata relating to a user interface, loading a logical description for the user interface based on the metadata, retrieving functional options related to the metadata and determining requirements for at least one additional change to the user interface based on the functional options and retrieving access rights available for a user of the user form interface. The method further includes using a forms engine to organize form elements based on predefined criteria and automatically generating visual description data based on the logical description, the functional options, the access rights available to the user and user settings. Furthermore, the visual description data is provided to a client device that customizes the user form interface based on display setting of the client device.

17 Claims, 9 Drawing Sheets

(56) References Cited

U.S. PATENT DOCUMENTS

| | | | |
|---|---|---|---|
| 2006/0136830 A1* | 6/2006 | Martlage | G06F 17/243 715/745 |
| 2007/0186150 A1* | 8/2007 | Rao | G06F 17/243 715/205 |
| 2010/0114619 A1* | 5/2010 | Birsan | G06Q 10/06 705/7.11 |
| 2011/0131479 A1* | 6/2011 | Padgett | G06F 3/04895 715/223 |
| 2013/0205189 A1* | 8/2013 | DiPierro | G06F 3/0483 715/224 |

* cited by examiner

METHOD AND SYSTEM OF AUTOMATED GENERATION OF USER FORM INTERFACE

CROSS-REFERENCE TO RELATED APPLICATIONS

This application is a continuation-in-part of and claims benefit of priority to Russian Patent Application No. 2015116133 filed Apr. 29, 2015, which is incorporated herein by reference in its entirety.

TECHNICAL FIELD

The present disclosure generally relates to a system and method for generating user interfaces for an application and, more particularly, to a system and method carrying out an automatic generating of user interfaces in the form of dynamically changing screen forms.

BACKGROUND

Personal computers and other computing devices, such as smartphones, personal digital assistances, tablets, and the like, require user interfaces for the user to communicate and interact with the application or service provided on the device. However, the creation and design of these interfaces can often be quite time consuming and labor intensive. There are certain computer programs that exist that facilitate a developer's generation of a user interface. For example, one system and method is known for creating form-like user interfaces for many technologies of visualization of target screen objects on various types of platforms, in which a developer can previously create, on the basis of a developed model of the application and a selected type, a logical form of the required data objects, which afterwards forms the user interface, together with a group of logical and physical control elements. However, this solution is very labor intensive since the developer must manually create every new form. Accordingly, what is needed is a system and method enabling a developer to create an improved user interface in which the form can be generated automatically.

SUMMARY

The disclosed system and method provides a user with flexible and rapid creation of user interfaces having standard functionality, without forfeiting the quality and ergonomic design of these interfaces.

Advantageously, the disclosed system and method provide an increased flexibility and speed of development with fine tuning of the application program solutions achieved by the automatic generation of forms, which then ensure a positioning and displaying of the elements of the user interface in conformity with ergonomic requirements.

According to one aspect, a method is disclosed for dynamically generating a user interface for an application. The method includes accessing object metadata relating to a requested user form interface; loading, from a database, a logical description for the user form interface based on the accessed object metadata, wherein the logical description includes at least declarations of form elements and commands for the user form interface; retrieving, from the database, functional options related to the accessed object metadata and determining requirements for at least one additional change to the user form interface based on the functional options; retrieving access rights available for a user of the user form interface; activating a forms engine containing formatting rules adapted to organize the form elements based on predefined criteria; automatically generating, by the forms engine, visual description data for the user form interface based on the logical description, the functional options, the access rights available to the user and user settings, the visual description data being non-device specific; and providing the visual description data to a client device that customizes the user form interface based on display setting of the client device.

According to another aspect, the predefined criteria include sets of logical, ergonomic, aesthetic and business criteria.

According to another aspect, the display setting of the client device include at least one of a size of a screen of the client device, a specified resolution of the screen of the client device, a specified font of the screen of the client device, an operating system of the client device, and a browser of the client device.

According to another aspect, the method includes displaying information messages on the client device related to specific elements of the user form interface in a window adjacent to the form elements if the user has incorrectly entered data into at least one of the form elements.

According to another aspect, the logical description for the user form interface further includes information about one or more of a size and order of form elements.

According to another aspect, the logical description further includes at least one or groupings of the form elements and one or more global commands that apply to a plurality of related forms.

According to another aspect, the logical description further includes one or more commands adapted to open new form user interfaces with the retrieved form data.

According to another aspect, a server system is disclosed for dynamically generating application forms. According to this aspect, the server system includes a database configured to store logical descriptions for at least one user form interface, wherein the logical descriptions include at least declarations of form elements and commands for the user form interface; a network interface configured to: access object metadata relating to a requested user form interface, load, from the database, at least one logical description for the user form interface based on the accessed object metadata, wherein the logical description includes at least declarations of form elements and commands for the user form interface, load, from the database, functional options related to the accessed object metadata and determining requirements for at least one additional change to the user form interface based on the functional options, and retrieve access rights available for a user of the user form interface; and a forms engine formatting rules adapted to organize the form elements based on predefined criteria and to automatically generate visual description data for the user form interface based on the logical description, the functional options, the access rights available to the user and user settings, the visual description data being non-device specific, wherein the network interface is configured to provide the visual description data to a client device that customizes the user form interface based on display setting of the client device.

According to another aspect, A computer program product stored on a non-transitory computer-readable storage medium, the computer program product comprising computer-executable instructions for dynamically generating application forms, including instructions for: accessing object metadata relating to a requested user form interface; loading, from a database, a logical description for the user form interface based on the accessed object metadata, wherein the logical description includes at least declarations of form elements and commands for the user form interface; retrieving, from the database, functional options related to the accessed object metadata and determining requirements for at least one additional change to the user form interface based on the functional options; retrieving access rights available for a user of the user form interface; activating a forms engine containing formatting rules adapted to organize the form elements based on predefined criteria; automatically generating, by the forms engine, visual description data for the user form interface based on the logical description, the functional options, the access rights available to the user and user settings, the visual description data being non-device specific; and providing the visual description data to a client device that customizes the user form interface based on display setting of the client device.

The disclosed system and method is less laborious than conventional user interface generation methods since the user does not need to develop (that is, design, draw the tree of elements, program their behavior) all possible forms for each of the configuration objects. Thus, the process of development or fine tuning of the applied solution is substantially quickened.

Furthermore, the disclosed system and method enlarges the tool kit of technical resources so that two or more forms can be created in automated fashion for the same metadata object. Any of the forms subordinated to this object can be designated as the main one.

The above simplified summary of example aspects serves to provide a basic understanding of the disclosed system and method. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

FIGS. 2(*a*) and 2(*b*) illustrate block diagrams for a system of automatically generating a user interface according to an exemplary aspect.

FIGS. 6(*a*) and 6(*b*) illustrate software product screenshots launched in runtime (execution mode) according to an exemplary aspect.

DETAILED DESCRIPTION

Example aspects are described herein in the context of systems, methods, and computer program products, for automatically generating user interfaces in the form of dynamically changing screen forms. Those of ordinary skill in the art will realize that the following description of example aspects of system and methods for automatic user interface generation is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same items.

Specifically, the system and method for automated generation of user interface includes a hardware and software platform that provides application solutions for automation of accounting tasks, electronic documentation, management of enterprise resources, and the like. The hardware and software platform constitutes a general-purpose computer with peripheral input/output devices, including, for example, PC-compatible devices, or several computers combined into a local area network on which a general-purpose operating system is installed, and also having specialized software to implement the disclosed methods. According to the exemplary aspect, the specialized software is software that can execute in its environment user application. Complete functionality that the end user or group of end users will work with shall also be called hereinafter the "user application". The disclosed system and method relate to the software platform that, facilitates and accelerates automated development and/or customization of user applications.

Figure 7:
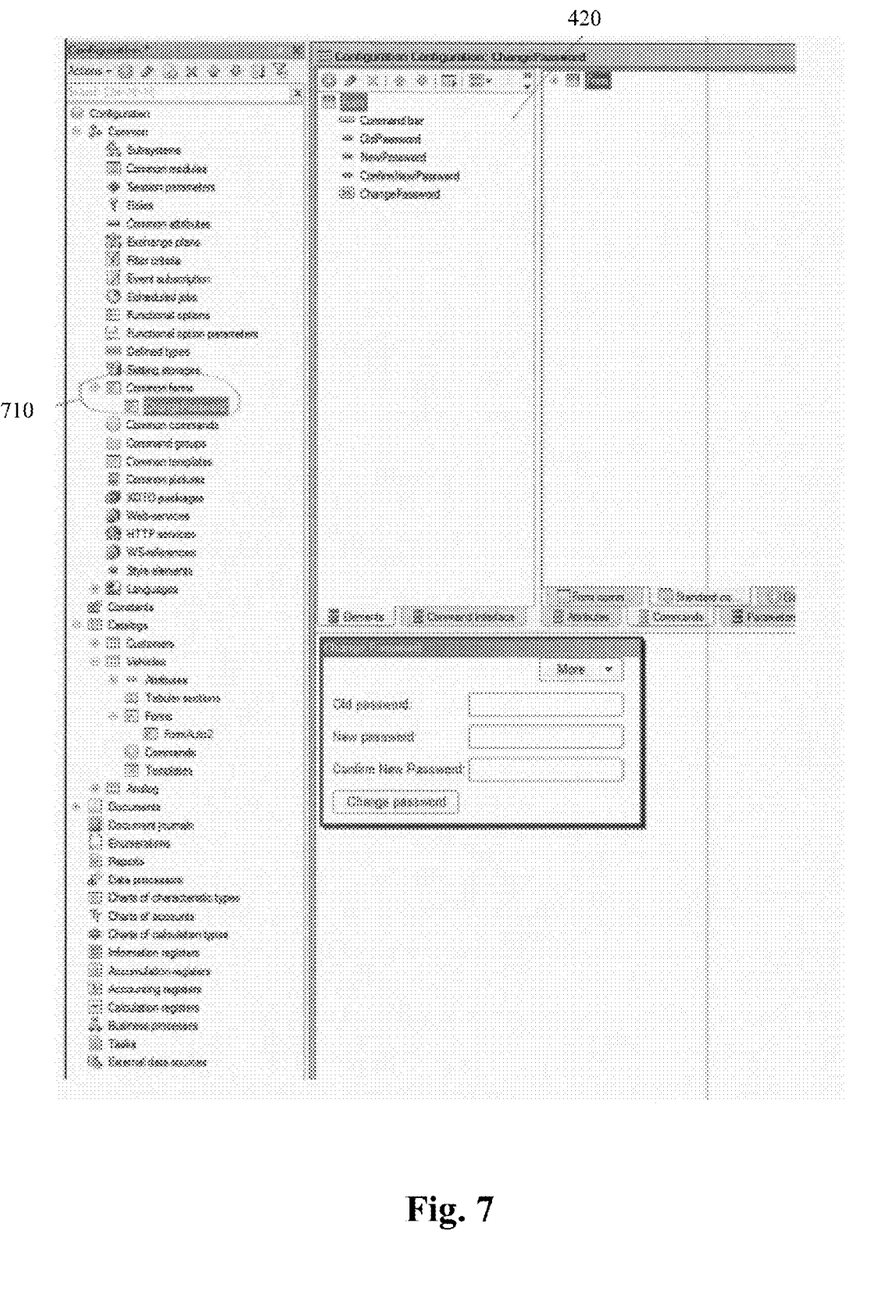
FIG. 7 illustrates a screenshot of the software application running at design time (design mode) according to an exemplary aspect.

The disclosed system and method provides the developers of user applications with the ability to assemble a customizable user application in the manner of a builder from metadata objects, which include for example directories, documents, information records, charts of accounts, and the like. It should be appreciated that these classes of metadata objects are provided/described in the platform for the designer. According to exemplary aspect and as shown in FIG. 7, for example, the metadata objects can be characterized as "Catalogs", "Documents", "Information registers", "Charts of accounts", respectively. According to one aspect, each of the metadata objects contains its own algorithm of functioning and interacting with other metadata objects.

Figure 4:
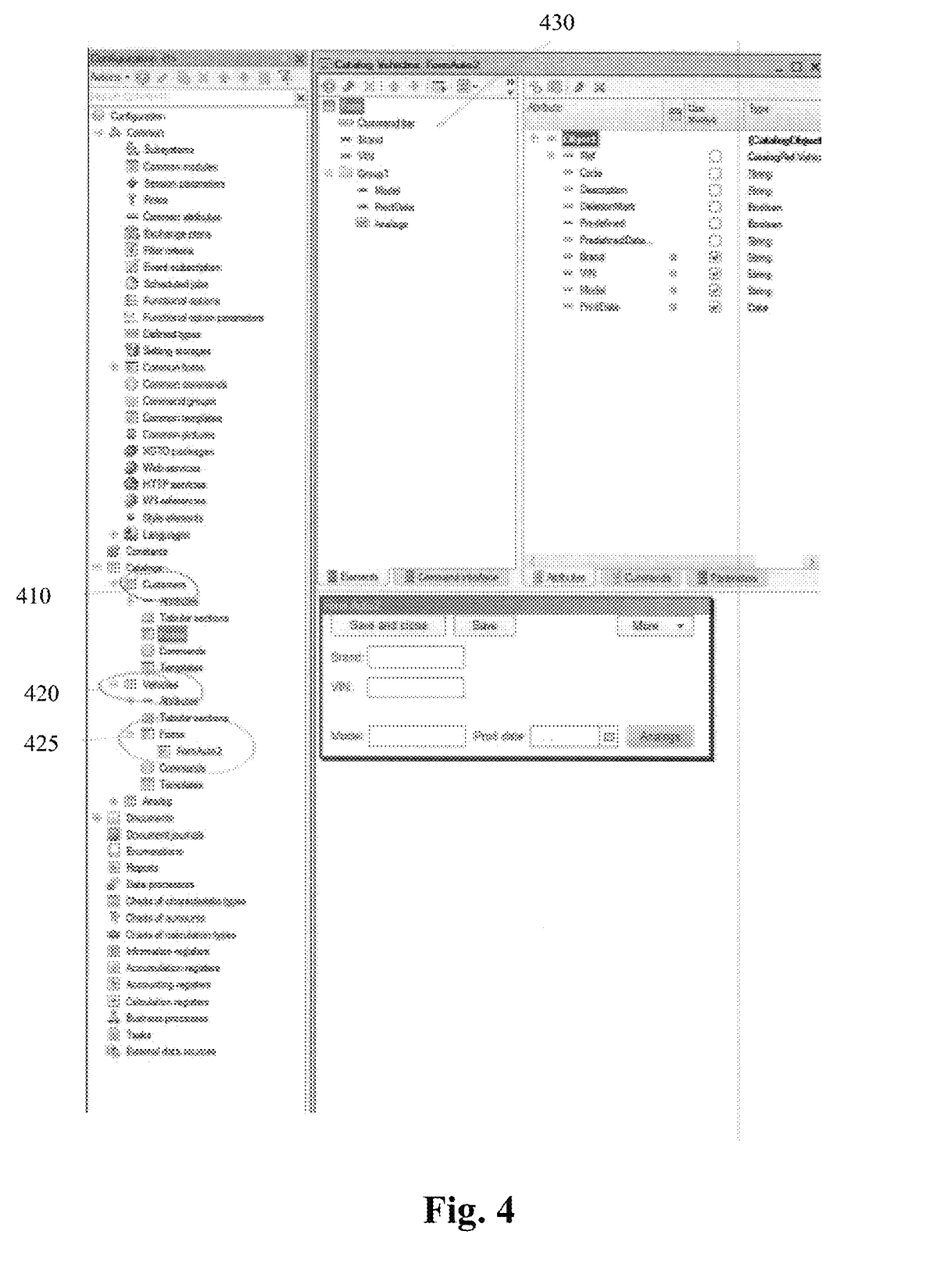
FIG. 4 illustrates a screenshot of a software application executed during design programming according to an exemplary aspect.

In one exemplary aspect, the user interface of the user application will primarily comprise a plurality of forms. The end users of the user application will mainly work with these forms. Forms are used for display and editing of information contained in a database. According to an exemplary aspect, a specific form is accessed based on the object. For example, a developer will first create an object (e.g., Directory "Category Vehicles" shown in FIG. 4) or a document and then the object is used to create a form. More particular, as shown in FIG. 4 (discussed in detail below), a "configuration" tree is provided with the "Catalogs", "Vehicles" and then "Forms". Thus, as shown, Form "FormAuto2" 425 is a child of the directory "Vehicles" 420.

According to one aspect, the forms, like the other metadata objects, may be saved as certain information structures in the database. Physically, the metadata objects may be stored either in the same database with information about the subject area, assembled by the end user (user data), or in a separate database. According to one aspect, the end users do not edit the metadata, and, therefore, do not have the capability of altering the functionality of the configuration, which is the task of the developers or administrators of the configurations.

Based on a logical description that will be discussed in detail below, the disclosed system and method produces the external appearance of the form for display to the end user. In this process, the system takes into account the various properties of the data being displayed (such as the type) in order to arrange the elements of the form with maximum convenience for the end user. The specific positioning of the elements comprising the tree of elements as well as the elements of the command interface is performed automatically by the system when displaying (drawing) the form.

According to the exemplary aspect, the logical description of the form can include a group of several components, including but not limited to, for example:

Elements or a tree of elements—a group of objects configured to determine the visual presentation of the form and providing interaction with the end user;

Details (attributes)—objects that describe the data that the form uses in its operation, including the type and sources of data;

Commands/action teams—actions that are predetermined for each specific form;

Command interface—a set of commands displayed in the form (for example, interactive buttons or a menu or the like) that can be used (executed) either for a specific form or for the entire object with which it is linked;

Options—objects whose values condition the behavior of a specific copy of the form when loading it into memory, in one aspect, the parameters remain constant in the course of the "life" of the form copy, it can be used for pre-transmitting values from one form to another form; and Module—a program in a built-in language responsible for working with elements, processing of events, reading and writing of the data being edited in the form, and converting the data of the form into corresponding database records and vice versa.

According to an exemplary aspect, the functionality of the form is determined by the tree of elements, the details (data with which the form works), and the actions (commands) being executed. Thus, when a particular form is accessed by a developer to generate the user interface, the corresponding tree of elements, requisites and actions associated with that form is accessed by the system.

Forms can belong to particular metadata objects of a configuration or not be associated with any specific metadata. As described above with respect to FIG. 4, an exemplary situation can be provided in which an object is first created using the metadata, and then a form can be create based on the object (e.g., "FormAuto2" 425, which is a child of the directory "Vehicles" 420). However, it should also be appreciated that there are situations when the form does not belong to any object and is independent. For example, the form can add a "Common forms", such as "ChangePassword" 710, facilitating the designer to change the password of user data, as shown in FIG. 7, for example.

Accordingly to the exemplary aspect, the system, using the predefined rules built into it, will automatically create a form for a metadata object such as a directory, a document, an information record. Advantageously, the developer does not need to design and "draw" a new form with a tree of elements each time a new metadata object is added.

In addition to automatically creating the forms, the developer of the user application using a form editor can create/edit a form, define the makeup of its requisites, commands, and displayable elements, and also determine the placement of the elements by various settings, determine the sequence of the elements, and specify the desired width and height, thereby composing, arranging and displaying the elements of the form in a more convenient order for the work of the end user.

Figure 5:
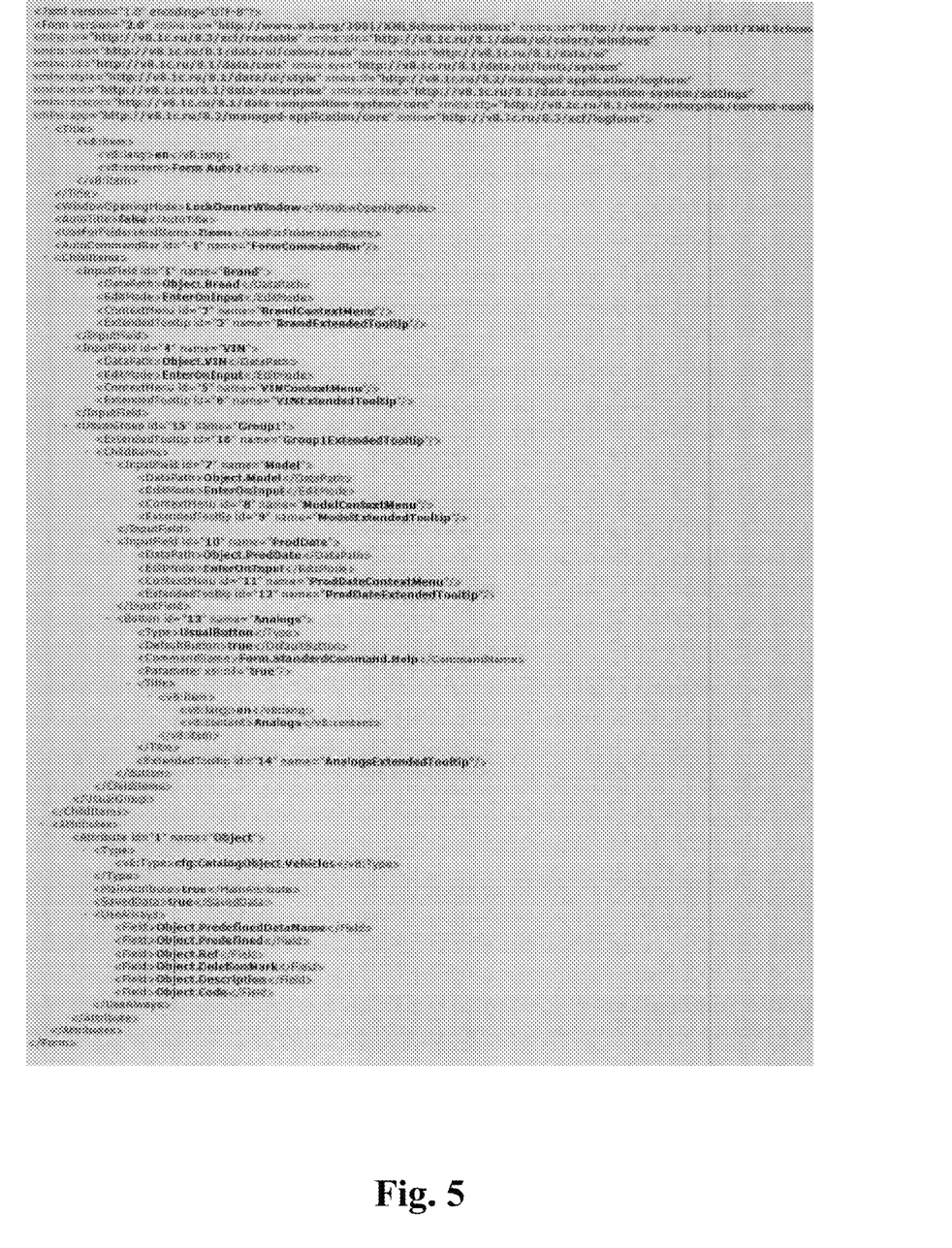
FIG. 5 illustrates exemplary logical structures of XML-form descriptions according to an exemplary aspect.

To specify the external appearance of the form to be displayed on a screen for the end user, a description is used in the form of a tree, including the elements of the form such as: input fields, flags, switches, buttons, panel with border, panel with pages (bookmarks), the page itself, command panel, table, also including elements (columns), and so forth. As described above, FIG. 4 illustrates an exemplary screenshot of a tree of form elements 430. Moreover, FIG. 5 illustrates the same tree form elements, but is illustrated in the form of XML-structures. It should be appreciated that the exemplary tree is not so limited according to the exemplary elements shown in FIGS. 4 and 5, and/or the specific positioning of the location of elements on the screen. Rather, these exemplary aspects only illustrate the sequence and grouping of elements.

As discussed above, the form requisites are used to link the form to the necessary data. In particular, the requisites indicate the list of data to be displayed by the form. The requisites are edited in the command list. The developer has the capability of adding or removing details of the form.

As further described above, all actions in the form are executed by commands, which serve as a description of how one action or another should be performed. The commands of a form are edited in the command list. The developer has the ability to add and remove commands of the form, as well as assign their properties, with the help of a set of properties stored in a database. According to one aspect, for each command, the developer can designate a procedure that will be executed when this command is invoked by the user. In order for a command to begin executing its function, it must be linked to a necessary element of the form (i.e., an event related to it).

According to one aspect, for the forms of a configuration being developed, the developer can use both the commands of the form itself (i.e., local commands) as well as global commands that are used in the command interface of the entire configuration. In this aspect, global commands can be simple (such as a command to open another directory or document) and parameterizable, when a certain parameter based on the data of the current form is sent along with the command (for example, this can be a call to report on stock on hand in a warehouse which is presently selected in an expenditure invoice form).

In one aspect, all the forms generated for a given type of object may have identical behavior. Thus, for any given object of "directory" type, one can require the displaying of the list of its elements, its individual elements, the directory group, and select elements and groups of elements from the directory. To enable the execution of such standard actions, one will generate a set of subordinate forms for each of the type of objects, which will be used when executing the corresponding actions.

For example, for the object "Contractors directory" there is generated a first form for editing of some or all fields of the requisites card of an individual selected contractor (e.g., name, address, telephone, taxpayer ID, full name of the manager, and the like), and a second form, where the full list of contractors will be outputted. With the aid of this second form, the user can view and sort through the list, remove entire groups of contractors, and the like.

In one instance, if it becomes necessary to add a new object and its form to the user application, and if it is not necessary to create any other forms for the given object (such as those with a different design or specific appearance), the developer can simply add the new object of the user application, and the system will automatically use the rules built into the system to generate the required minimum for the object set of forms.

Accordingly, when adding a new object or when opening a particular data object, the system is automatically loaded with the object of the earlier developed logical description of the form, which will be displayed and edited with all the data relating to the object. If there is such a description, the system loads the logical description and on the basis of it there is a further generation of forms.

In contrast, if no such description has been loaded, the system can then determine the type of object loaded, that is, it determines what type of metadata objects of the configuration is it associated with (e.g., directory, document, information record, chart of accounts, and the like). After determining the type of object, the system selects from the set of rules containing the basic logical descriptions of all known types of metadata objects of the configuration the rule applying to the given object and generates the logical description.

According to the exemplary aspect, before the end user sees the form on his or her screen, the system will perform the following operations: generation of form, transformation of form, output (i.e., drawing) of form. Thus, after the logical description of the forms of the object has been obtained (whether generated automatically or previously saved by the developer), the system begins to transform it. The transformation involves the step of changing the user interface on the basis of the functional options, access rights, and use of the user settings. Changing the user interface on the basis of the functional options makes it possible to single out, in an applied solution, a functionality the can be turned on and off when implementing it, without changing the applied solution itself.

Depending on the access rights of the end user, the system determines precisely which data cannot be presented to the user for display or editing in the form. With the help of the user settings, the user himself can turn on and off the form elements needed for display. Thus, on the basis of the description, the functional options, the access rights and the user settings, the system provides for the displaying (drawing) of the visual presentation of the form for the specific user.

Moreover, with the help of the system, a variant of the method can be implemented, wherein after the displaying (drawing) of the visual presentation of the form and the end user beginning to work with it, information messages are outputted with reference to specific elements of the form, being displayed in a special window of the form located beneath those form elements where the user has made a mistake when entering data. For example, if, when creating a new document the user has entered text in the date field or failed to fill out mandatory fields, the system tells him about this in said special window.

Figure 1:
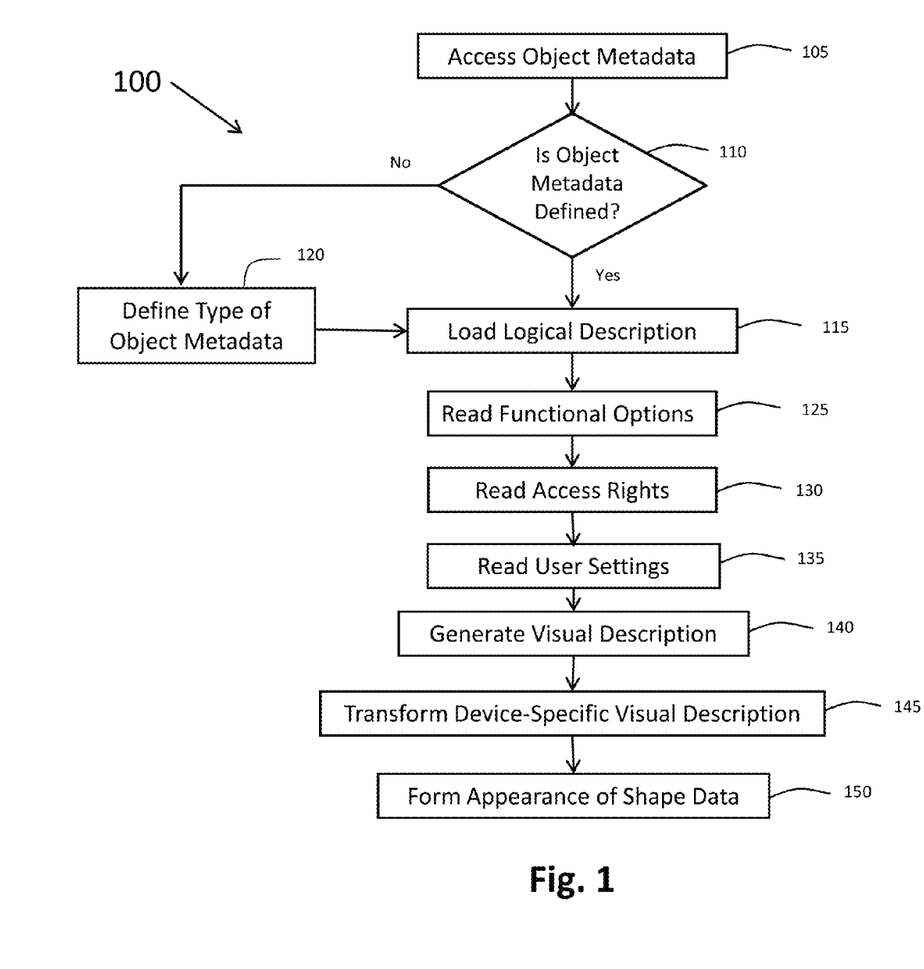
FIG. 1 illustrates a flowchart for a method of automatically generating a user interface according to an exemplary aspect.

FIG. 1 illustrates a flowchart for a method 100 of automatically generating a user interface according to an exemplary aspect. As shown, initially, when a user begins the automated process of generating a user interface, the disclosed system accesses one or more objects at step 105 relating to the requested user interface. Specifically, according to an example referring to FIG. 4, a user can select a specific object, for example, in the main menu, the use can select the "Vehicles" Guide, i.e., "Catalog Vehicles". This indicates that the user is interested in this directory, and so the system can illustrate the appropriate form with information from this directory.

Next, at step 110, the method determines whether object's form logical description is defined and saved by the developer. If yes, the method 100 proceeds to step 115 where the presence of the logical description is determined for the form for the loaded object. Alternatively, if the object's form logical description is not predefined by the developer, the method proceeds to step 120, where it is defined. Again, once defined, the method proceeds to step 115 where the presence of the logical description is determined for the form for the loaded object. In order to perform the disclosed method, the system will now be described with respect to FIGS. 2(a) and 2(b).

Figure 2A:
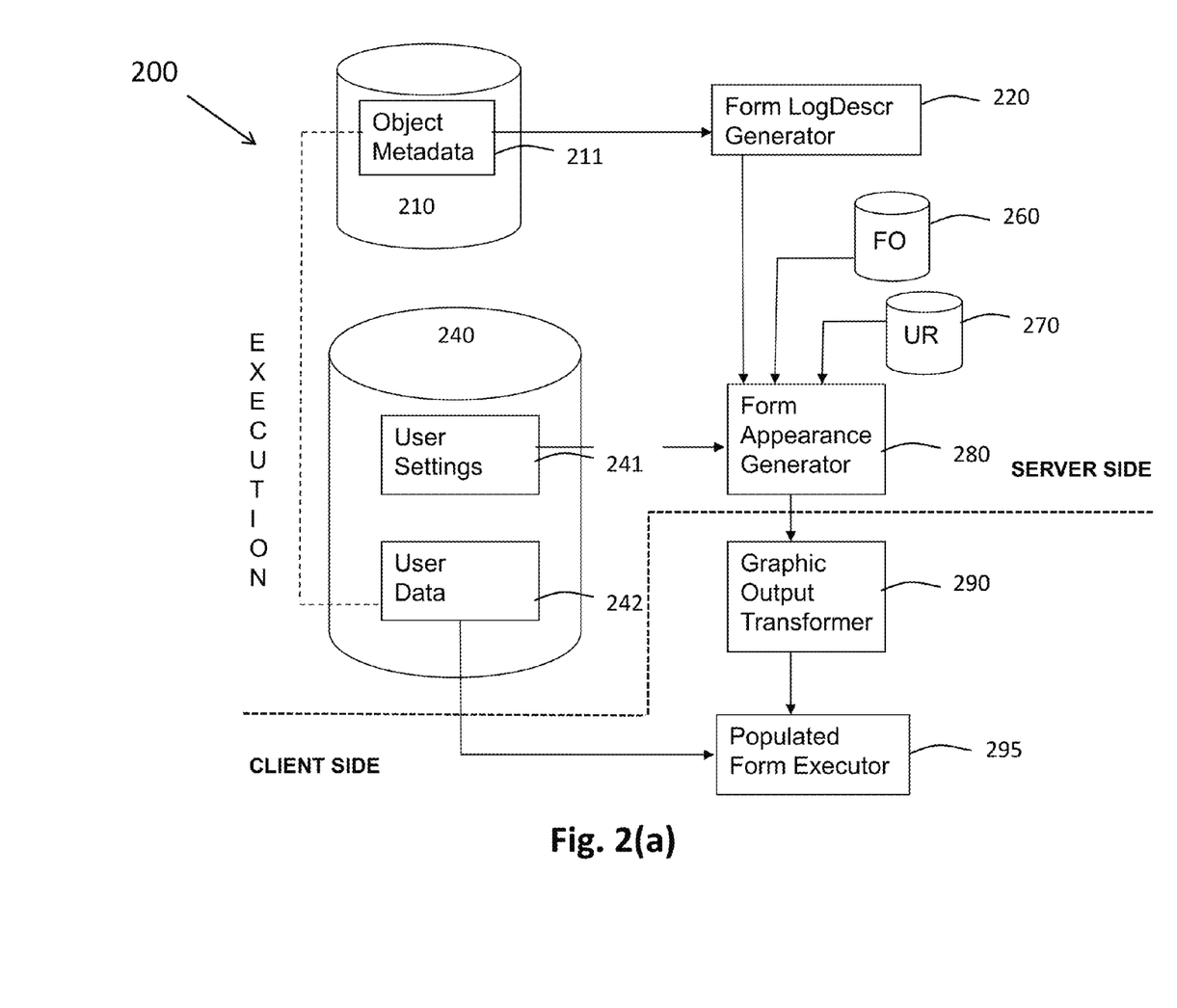
Figure 2B:
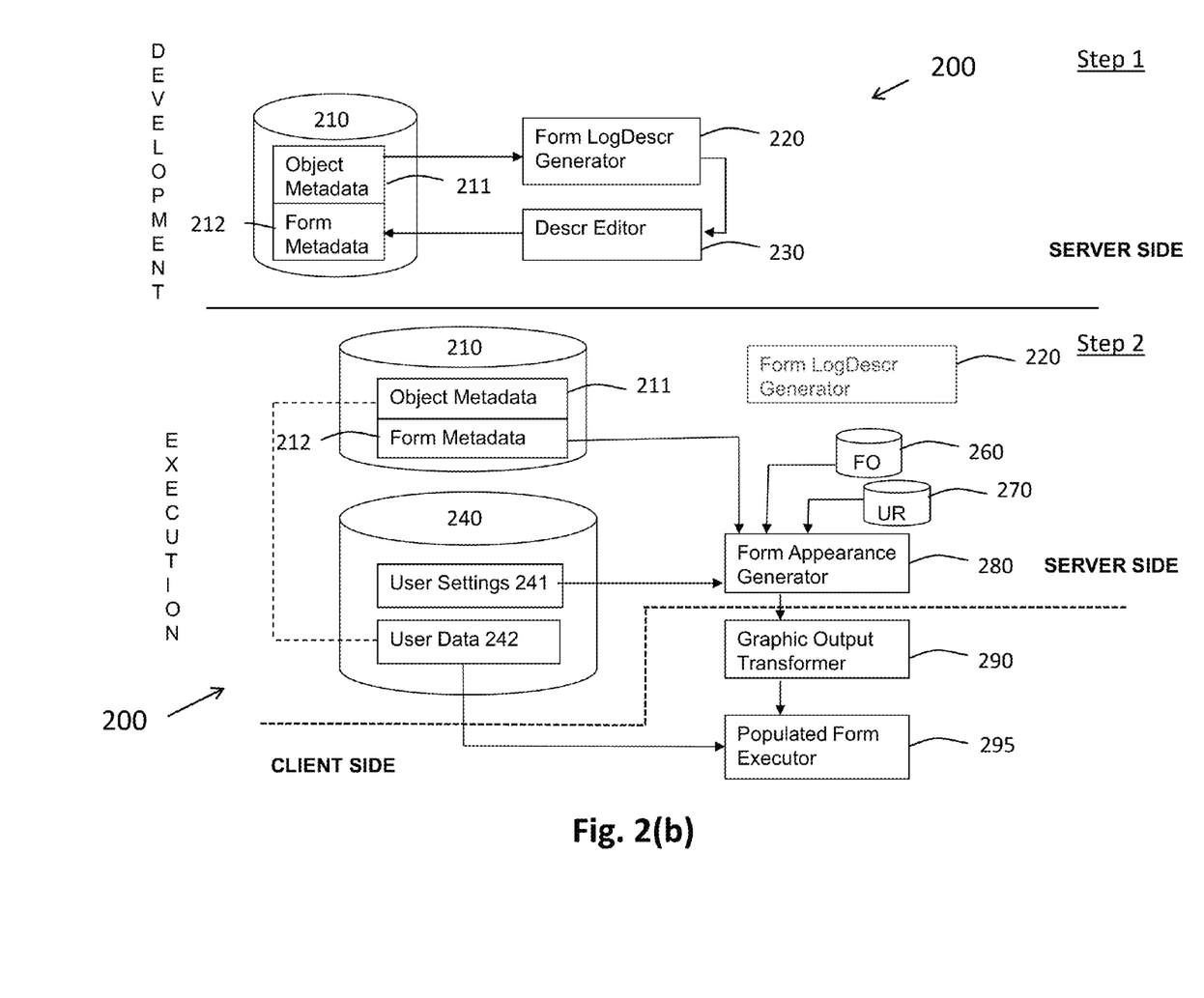
Figure 3:
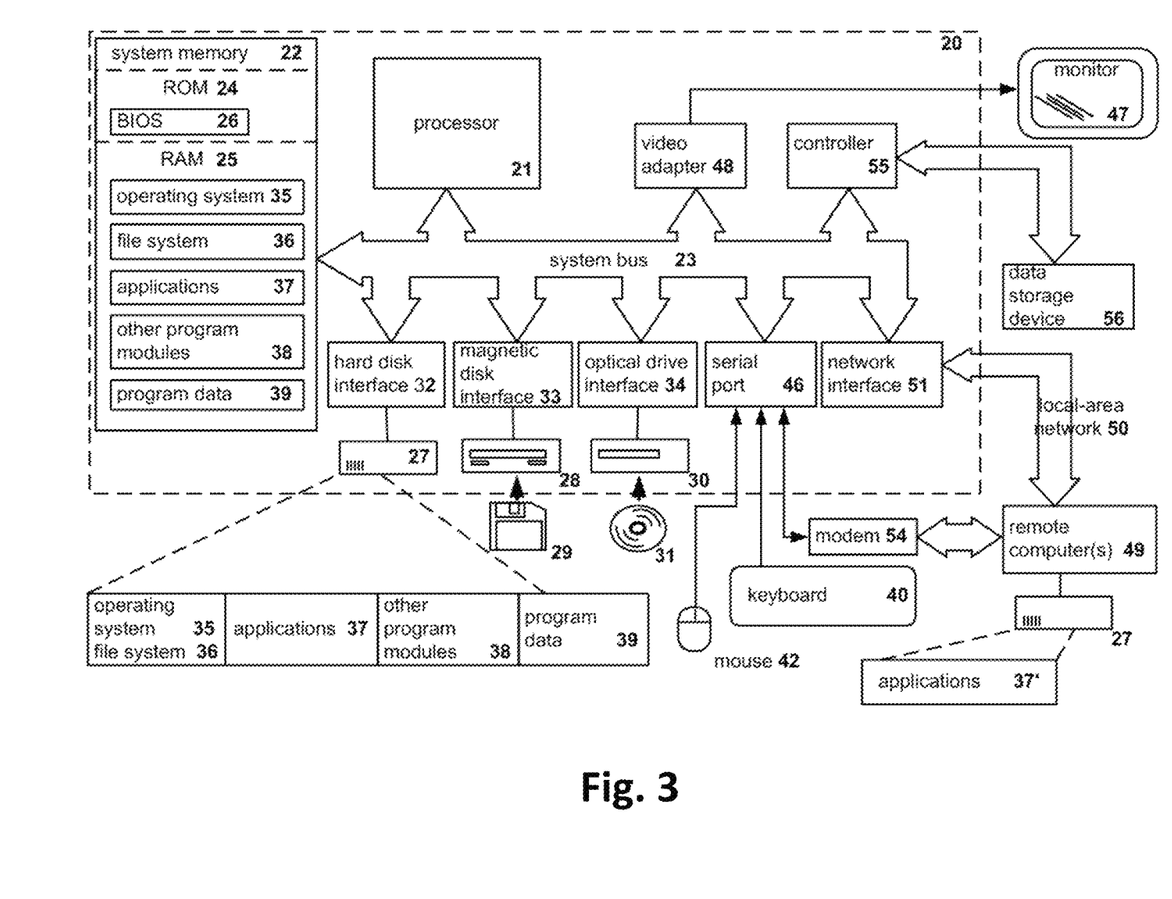
FIG. 3 is a diagram illustrating an example general-purpose computer system on which the system and method for automated generation of a user interface can be deployed according to an exemplary aspect.

In particular, FIGS. 2(a) and 2(b) illustrate a block diagram for a system 200 of automatically generating a user interface according to an exemplary aspect. It should be appreciated that the system 200 can be implemented using a computer system, such as the computer system described below with respect to FIG. 3. It should be appreciated that the various data described below can be stored on system memory 22, as shown in FIG. 3. Moreover, the modules (i.e., generators and executor) discussed below with respect to FIGS. 2(a) and 2(b) can be implemented as software/hardware modules as would be appreciated to one skilled in the art. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

Referring now to FIGS. 2(a) and 2(b), the exemplary aspects illustrate the interaction of modules and databases of the disclosed system. In particular, the system shown in FIG. 2(a) implies the absence of a pre-arranged and stored logical description forms for the corresponding object. Moreover, the system 200 of FIG. 2(b) implies the presence of previously prepared and stored (in the development phase) of the logical description of the form of the corresponding object. In this regard, FIG. 4 (described above) illustrates an example of the development of a simple test application, which is those provided for "Customers" directory 410 where there is no description of the shape. In contrast, the "Vehicles" directory 420 has been developed in advance and maintains the logical description of the form "FormAuto2"

Figure 6A:
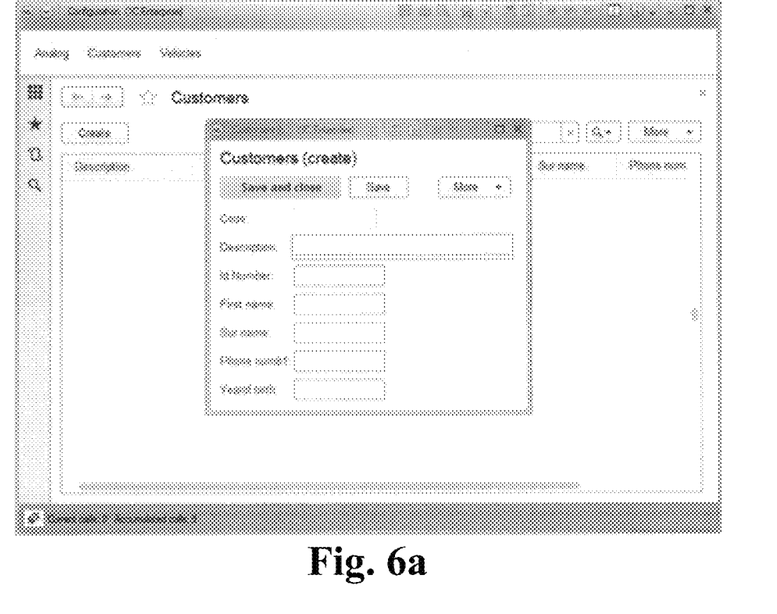
Figure 6B:
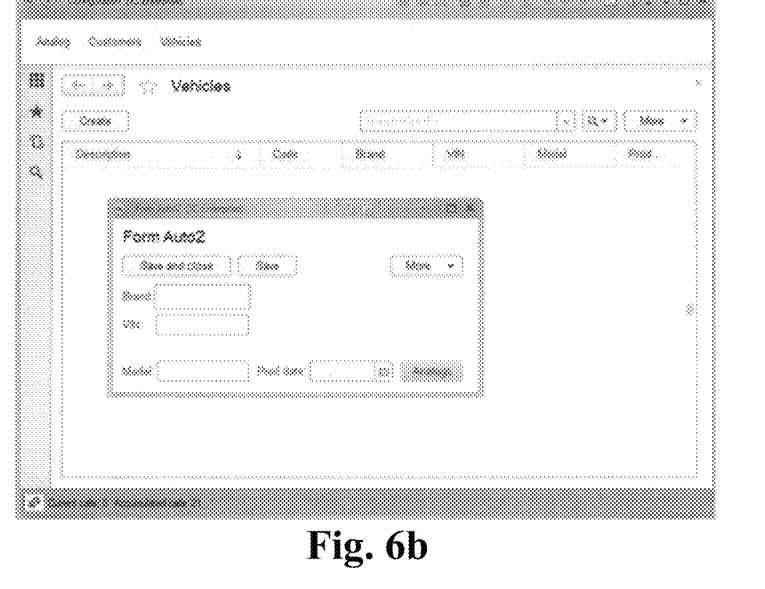

425. However, during the execution, a form will be automatically generated for the user as shown in FIG. 6(*a*), for example.

Referring back to FIG. 2(*a*), a user can access a particular object based on the "Customers" directory 410. In this instance, the system can check and ensure that the pre-stored logical description form for this object is present or not present. As shown, a Form LogDescr (i.e., logical description) Generator 220 accesses the object metadata 211 of the object of interest and receives information on the type and other characteristics of the object. Based on the received information, the Generator 220 automatically generates a logical form for the description of the object and provides the logical form to the form input of the form appearance Generator 280. In turn, the Generator 280 is a type of "form engine" that is configured to generate the appearance, format, at the like, of the future form based on formatting rules (using the "user settings 241, for example), but without the data. Instead, for this purpose, besides the logical description, three parameters are input including: a functional option ("FO") 260, access rights ("UR") 270, and user settings 241 stored in an electronic database 240, for example. According to the exemplary aspect, the user settings 241 can contain formatting rules adapted to organize the form elements based on predefined sets of logical, ergonomic, aesthetic and business criteria. Thus, the end user can define these user settings to be customized to their preferences and the like, including, for example, the look and positioning of the different elements on the form.

Figure 8:
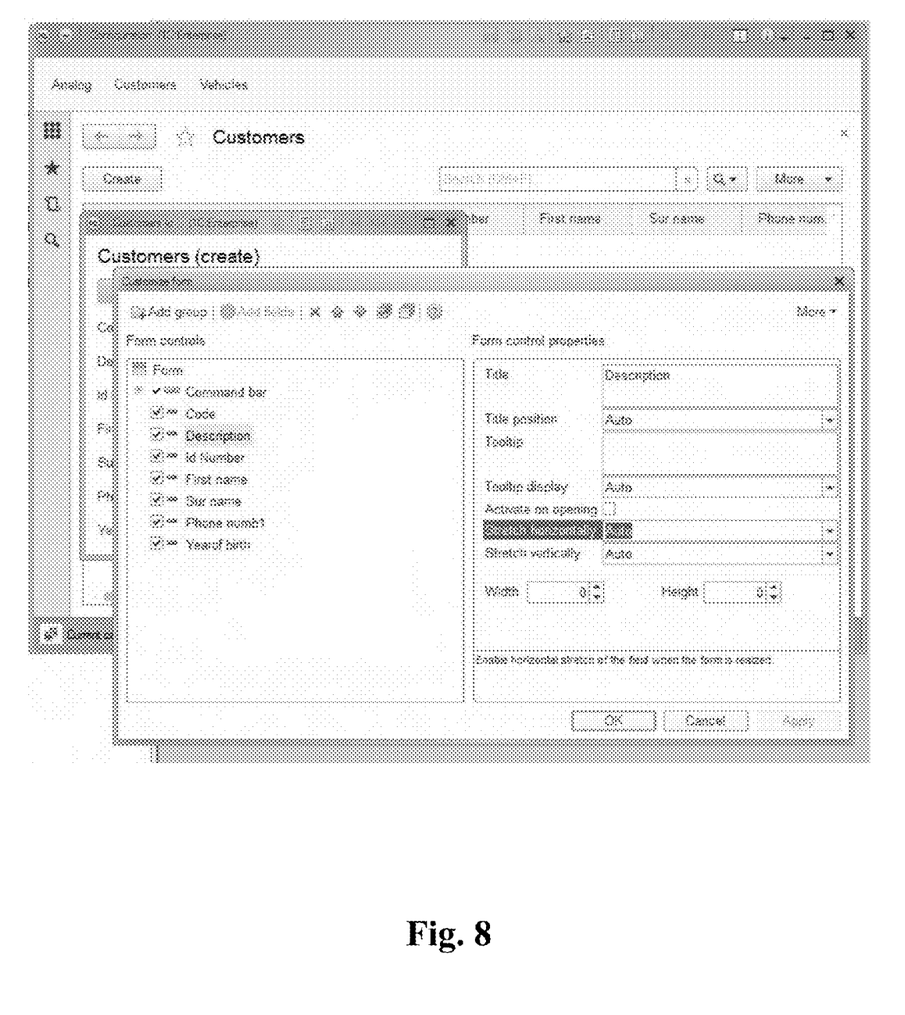
FIG. 8 illustrates a screenshot of the software application providing configuration of user settings according to an exemplary aspect.

FIG. 8 illustrates a screenshot of the software application providing configuration of user settings according to an exemplary aspect. According to the exemplary aspect, the user can rearrange the fields (optionally) to change some the fields' appearance and, if desired, making some of the unused fields as not visible (if not required).

As specifically shown, the screenshot illustrates an interface for preparing/changing user setting 241, as described above for FIGS. 2(*a*) and 2(*b*). According to one aspect, user settings 241 may be limited to: interchanging fields (i.e., making the unused fields as not visible (if not required)), changing the appearance and location of the fields, for example, explicitly specifying the element size in absolute terms. According to one aspect, the user cannot add a new field.

Accordingly, in view of the User Rights 270, functional options ("FO") 260 and User Settings 241, logical description will be changed in the Form Appearance Generator 280 (compared with how it was stored in the metadata form a developer 212). The logical description will then optionally be converted into an intermediate view—i.e., a visual description, after which the latter is ready to transfer to the client side.

On the client side as shown in FIGS. 2(*a*) and 2(*b*), the resulting form of the description generated by the Form Appearance Generator 280 will be transmitted to the input of the Graphic Output Transformer 290. The Graphic Output Transformer 290 is configured to optimize the shape of the resulting form for specific characteristics of the client device, such as a workstation, a smartphone or the like.

In one exemplary aspect, an implementation of Graphic Output Transformer 290 on the web client (i.e., client side) may be implemented as a downloadable and executable in JavaScript or ActiveX browser environment, for example. As another example, the implementation of thin client under Unix system, with the latter being installed as part of the client application written in C++ from the installation package .deb.

According to the exemplary aspect, the output of Graphic Output Transformer 290 provides a visual description already sufficiently detailed in order to ensure the drawing elements on a specific client device based on the size of its screen, a specified resolution, used screen fonts, the operating system, such as the client application (browser or thin client), etc. According to one aspect, for a visual representation, the output Graphic Output Transformer 290 may already contain the exact dimensions and the coordinates of all the visual elements in absolute terms.

In addition, when the appearance and shape of the form is already defined, the Populated Form Executor module 295 can be accessed and the data content of the form data domain (i.e., "User Data") 242 can also accessed from database 240 that relates to the object of interest. Form data may then be displayed on the corresponding display unit (monitor, a smartphone display, etc.).

As noted above, FIG. 2(*b*) illustrates a system enabling the developer to start a logical description of a desired format, which also utilizes Form LogDescr Generator 220. As noted above, Generator 220 is configured to access the object metadata 211 and receives this information on the type and other characteristics of the object based on the information received. In addition, the Generator 220 automatically generates a logical description of some preliminary form for this object and provides the logical description to the developer to be modified. With a Description ("Descr") Editor 230, which is optional according to the exemplary aspect, the developer is enabled to make changes to the logical description of the form and store the modified form as part of the form metadata 212.

In the second stage of the application as shown in FIG. 2(*b*), when the developer accesses a particular object, the system is configured to check and confirm that there is a pre-stored logical form description in the Form Metadata 212 for the object. According to the exemplary aspect, the pre-stored logical form description is a logical description that is provided to Form Appearance Generator 280. In turn, Generator 280 generates the non-device specific appearance and format of the future form, but without including data as described above. For this purpose, besides the logical description, the form is supplied with input three parameters, including the functional options ("FO") 260, user permissions (user access rights—"UR") 270 and user setting/preferences 241.

Further, when the appearance and format of the form is already set in the final device-specific outline, the Populated Form Executor module 290 is accessed and the data content of the form data domain 242, relating to the object of interest is further accessed by module 290.

It should be appreciated that the image in the form of metadata 212 chart, functional features 260, user access rights 270 and user settings 241, are provided as four separate sources (i.e., storage locations) and that they are shown to be physically stored in different databases according to the exemplary aspect, but could alternatively be provided in a single database. Nevertheless, it should be appreciated that provided these types of data as separate sources; the data can be generated at different times by different users, etc. Specifically, the Form Metadata 212 can be defined by the developer configuration, the functional options 260 can defined by implementers, which fits the typical configuration to the needs of a particular company, for example, the access rights 270 can be configured by the administrator within the company (although these may be modified from time to time), and finally the user settings 241 can be set by each individual final user to be customized to their preferences and the like.

Referring back to FIG. 1, step 115 specifically involves loading, from a database, one or more logical descriptions for the form based on the accessed object metadata (e.g., object metadata 211 of FIG. 2), wherein the logical descriptions include declarations of form elements and commands for the form. Once the logical descriptions are loaded, the method proceeds to step 125 where functional options in relation to the object are read. According to one aspect, the method further includes determining the need for additional changes in the user interface based on the read functional options. Next, the method reads or determines access rights (step 130) and user settings applied to the user (step 135).

Once this information is retrieved, the method generates a final non device-specific form's visual description at step 140 that is based on the logical description modified according to functional options, access rights and user settings. The form's description can then be sent from the server side to a client side.

On the client side, the form's description is subjected to a device-specific transformation at step 145, such that the form is customized for the specific client device. As noted above, this customization can be based on displaying settings, including the size of its screen, a specified resolution, used screen fonts, the operating system, such as the client application (browser or thin client), etc. Finally, at step 150, the form (i.e., the user interface) can then be filled with data object to display them in the generated form and the appearance shape data for the form can be prepared for display to the user on the screen.

FIG. 3 depicts one example aspect of a computer system 20 that can be used to implement the disclosed systems and methods for automated generation of a user interface for an application. The computer system 20 may include, but is not limited to, a personal computer, a notebook, tablet computer, a smart phone, a network server, a router, or other type of processing device. As shown, computer system 20 may include one or more hardware processors 21, memory 22, one or more hard disk drive(s) 27, optical drive(s) 30, serial port(s) 46, graphics card 48, audio card and network card(s) 51 connected by system bus 23. System bus 23 may be any of several types of bus structures including a memory bus or memory controller, a peripheral bus and a local bus using any of a variety of known bus architectures. Processor 21 may include one or more Intel® Core 2 Quad 2.33 GHz processors or other type of microprocessor.

System memory 22 may include a read-only memory (ROM) 24 and random access memory (RAM) 25. Memory 22 may be implemented as in DRAM (dynamic RAM), EPROM, EEPROM, Flash or other type of memory architecture. ROM 24 stores a basic input/output system 26 (BIOS), containing the basic routines that help to transfer information between the modules of computer system 20, such as during start-up. RAM 25 stores operating system 35 (OS), such as Windows® 7 Professional or other type of operating system, that is responsible for management and coordination of processes and allocation and sharing of hardware resources in computer system 20. Memory 22 also stores applications and programs 37. Memory 22 also stores various runtime data 39 used by programs 37.

Computer system 20 may further include hard disk drive(s) 27, such as SATA HDD, and optical disk drive(s) 30 for reading from or writing to a removable optical disk 31, such as a CD-ROM, DVD-ROM or other optical media. Drives 27 and 30 and their associated computer-readable media provide non-volatile storage of computer readable instructions, data structures, applications and program modules/subroutines that implement algorithms and methods disclosed herein. Although the exemplary computer system 20 employs magnetic and optical disks, it should be appreciated by those skilled in the art that other types of computer readable media 56 that can store data accessible by a computer system 20, such as magnetic cassettes, flash memory cards, digital video disks, RAMs, ROMs, EPROMs and other types of memory may also be used in alternative aspects of the computer system 20.

Computer system 20 further includes a plurality of serial ports 46, such as Universal Serial Bus (USB), for connecting data input device(s), such as keyboard 40, mouse 42, touch pad and other. Serial ports 46 may be also used to connect data output device(s), such as printer, scanner and other, as well as other peripheral device(s), such as external data storage devices and the like. System 20 may also include graphics card 48, such as nVidia® GeForce® GT 240M or other video card, for interfacing with a display 47 or other video reproduction device, such as touch-screen display. System 20 may also include an audio card for reproducing sound via internal or external speakers. In addition, system 20 may include network card(s) 51, such as Ethernet, Wi-Fi, GSM, Bluetooth or other wired, wireless, or cellular network interface for connecting computer system 20 to network 50, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the concepts disclosed herein.

The invention claimed is:

1. A method for dynamically generating a user form interface for an application, the method comprising:
   accessing object metadata relating to a requested user form interface;
   loading, from a database, a logical description for the user form interface based on the accessed object metadata, wherein the logical description includes at least declarations of form elements and commands for the user form interface;
   retrieving, from the database, functional options related to the accessed object metadata and determining requirements for at least one additional change to the user form interface based on the functional options;
   retrieving access rights available for a user of the user form interface;
     activating a forms engine containing formatting rules adapted to organize the form elements based on predefined criteria;
   automatically generating, by the forms engine, visual description data for the user form interface based on the logical description, the functional options, the access rights available to the user and user settings, the visual description data being non-device specific; and
   providing the visual description data to a client device that customizes the user form interface based on display setting of the client device,
   wherein the display setting include at least one of: a size of a screen of the client device, a specified resolution of the screen of the client device, a specified font of the screen of the client device, an operating system of the client device, and a browser of the client device.

2. The method of claim 1, wherein the predefined criteria include sets of logical, ergonomic, aesthetic and business criteria.

3. The method of claim 1, further comprising displaying information messages on the client device related to specific elements of the user form interface in a window adjacent to the form elements if the user has incorrectly entered data into at least one of the form elements.

4. The method of claim 1, wherein the logical description for the user form interface further includes information about one or more of a size and order of form elements.

5. The method of claim 1, wherein the logical description further includes at least one or groupings of the form elements and one or more global commands that apply to a plurality of related forms.

6. The method of claim 1, wherein the logical description further includes one or more commands adapted to open new form user interfaces with the retrieved form data.

7. A server system for dynamically generating application forms, the system comprising:
   a database configured to store logical descriptions for at least one user form interface, wherein the logical descriptions include at least declarations of form elements and commands for the user form interface;
   a hardware processor configured to:
     access object metadata relating to a requested user form interface,
     load, from the database, at least one logical description for the user form interface based on the accessed object metadata, wherein the logical description includes at least declarations of form elements and commands for the user form interface,
     load, from the database, functional options related to the accessed object metadata and determining requirements for at least one additional change to the user form interface based on the functional options, and
     retrieve access rights available for a user of the user form interface; and
     a forms engine formatting rules adapted to organize the form elements based on predefined criteria and to automatically generate visual description data for the user form interface based on the logical description, the functional options, the access rights available to the user and user settings, the visual description data being non-device specific,
   wherein the hardware processor is configured to provide the visual description data to a client device that customizes the user form interface based on display setting of the client device,
   wherein the display setting include at least one of: a size of a screen of the client device, a specified resolution of the screen of the client device, a specified font of the screen of the client device, an operating system of the client device, and a browser of the client device.

8. The server system of claim 7, wherein the predefined criteria include sets of logical, ergonomic, aesthetic and business criteria.

9. The server system of claim 7, wherein the hardware processor is further configured to display information messages on the client device related to specific elements of the user interface in a window adjacent to the form elements if the user has incorrectly entered data into at least one of the form elements.

10. The server system of claim 7, wherein the logical description for the user form interface further includes information about one or more of a size and order of form elements.

11. The server system of claim 7, wherein the logical description further includes one or more groupings of form elements.

12. The server system of claim 7, wherein the logical description further includes at least one of one or more global commands that apply to a plurality of related forms and one or more commands adapted to open new form user interfaces with the retrieved form data.

13. A computer program product stored on a non-transitory computer-readable storage medium, the computer program product comprising computer-executable instructions for dynamically generating application forms, including instructions for:
   accessing object metadata relating to a requested user form interface;
   loading, from a database, a logical description for the user form interface based on the accessed object metadata, wherein the logical description includes at least declarations of form elements and commands for the user form interface;
   retrieving, from the database, functional options related to the accessed object metadata and determining requirements for at least one additional change to the user form interface based on the functional options;
   retrieving access rights available for a user of the user form interface;
   activating a forms engine containing formatting rules adapted to organize the form elements based on predefined criteria;
   automatically generating, by the forms engine, visual description data for the user form interface based on the logical description, the functional options, the access rights available to the user and user settings, the visual description data being non-device specific; and providing the visual description data to a client device that customizes the user form interface based on display setting of the client device, wherein the display setting include at least one of: a size of a screen of the client device, a specified resolution of the screen of the client device, a specified font of the screen of the client device, an operating system of the client device, and a browser of the client device.

14. The computer program product of claim 13, wherein the predefined criteria include sets of logical, ergonomic, aesthetic and business criteria.

15. The computer program product of claim 13, further including instructions for displaying information messages on the client device related to specific elements of the user form interface in a window adjacent to the form elements if the user has incorrectly entered data into at least one of the form elements.

16. The computer program product of claim 13, wherein the logical description for the user form interface further includes information about one or more of a size and order of form elements.

17. The computer program product of claim 13, wherein the logical description further includes at least one of one or more groupings of form elements and one or more global commands that apply to a plurality of related forms.

* * * * *